(12) United States Patent
Aoki et al.

(10) Patent No.: US 10,608,529 B2
(45) Date of Patent: Mar. 31, 2020

(54) INTERNAL VOLTAGE GENERATION CIRCUIT

(71) Applicant: SHARP KABUSHIKI KAISHA, Sakai, Osaka (JP)

(72) Inventors: Eiji Aoki, Sakai (JP); Yoshinao Morikawa, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/283,037

(22) Filed: Feb. 22, 2019

(65) Prior Publication Data
US 2019/0267893 A1    Aug. 29, 2019

(30) Foreign Application Priority Data
Feb. 28, 2018  (JP) ................. 2018-035709

(51) Int. Cl.
   *G05F 1/10* (2006.01)
   *H02M 3/07* (2006.01)
   *H04N 5/335* (2011.01)

(52) U.S. Cl.
   CPC .............. *H02M 3/07* (2013.01); *H04N 5/335* (2013.01); *H02M 2003/071* (2013.01)

(58) Field of Classification Search
   CPC ......... H02M 3/07; H02M 3/073; H03F 3/195; H03F 3/245
   See application file for complete search history.

(56) References Cited

U.S. PATENT DOCUMENTS

| | | | |
|---|---|---|---|
| 5,699,018 A | 12/1997 | Yamamoto et al. | |
| 2010/0052771 A1* | 3/2010 | Hartono | H02M 3/073 327/536 |
| 2012/0300552 A1 | 11/2012 | Neto et al. | |
| 2014/0035661 A1* | 2/2014 | Myers | H02M 3/07 327/536 |

FOREIGN PATENT DOCUMENTS

| | | |
|---|---|---|
| CN | 102801304 A | 11/2012 |
| JP | H09-163721 A | 6/1997 |
| TW | 200721188 A | 6/2007 |

* cited by examiner

*Primary Examiner* — Sibin Chen
(74) *Attorney, Agent, or Firm* — ScienBiziP, P.C.

(57) ABSTRACT

An internal voltage veneration circuit includes negative voltage generation circuits of a first type and a second type, and the negative voltage generation circuits of the first type and the second type are connected parallel to each other. A drive signal is input to a charge pump circuit from a signal drive circuit in opposite phases in the negative voltage generation circuits of the first type and in the negative voltage generation circuits of the second type. A plurality of pairs of a negative voltage generation circuit of the first type and a negative voltage generation circuit of the second type are disposed, and the negative voltage generation circuit of the first type and the negative voltage generation circuit of the second type are located adjacent to each other.

4 Claims, 12 Drawing Sheets

FIG. 12A
FIG. 12B
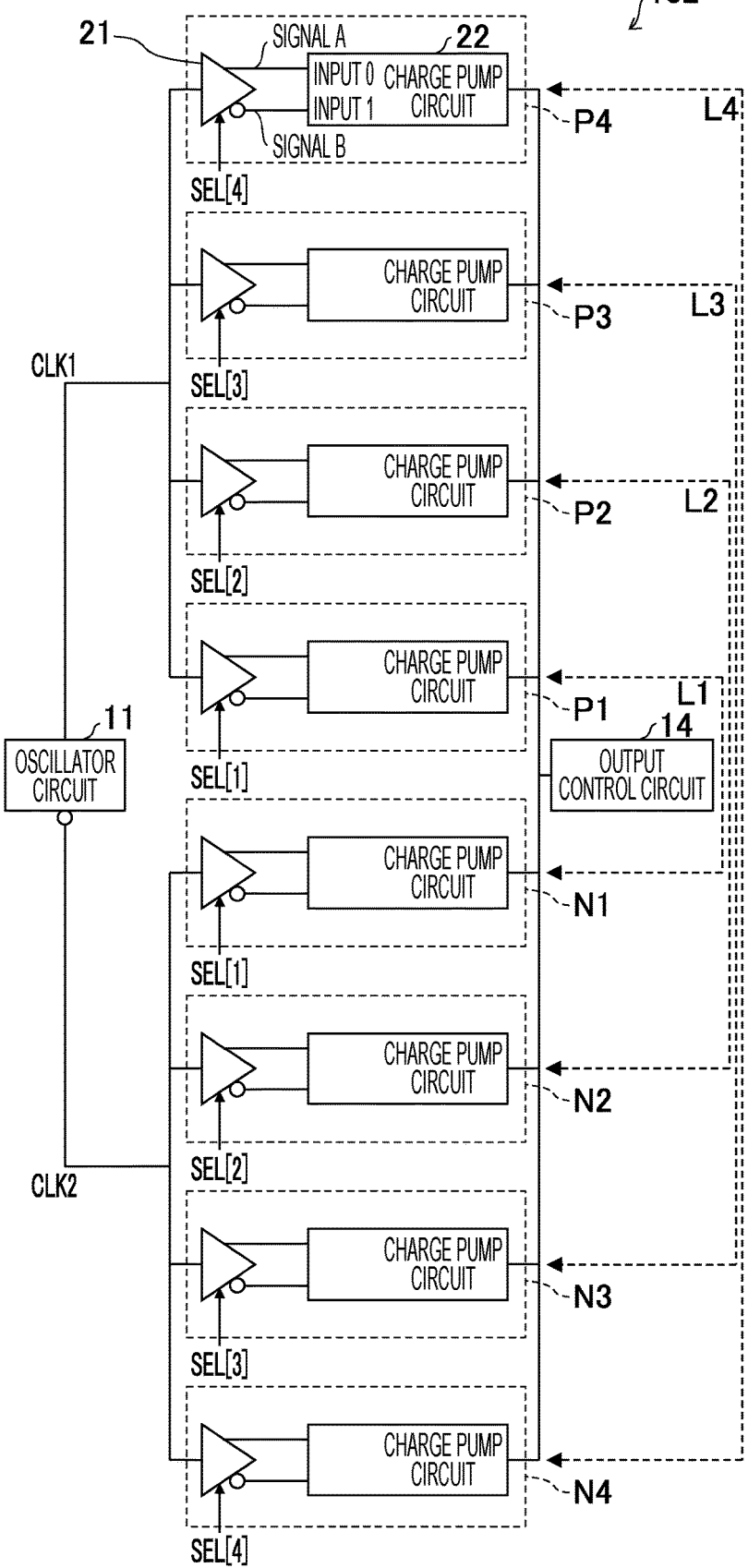
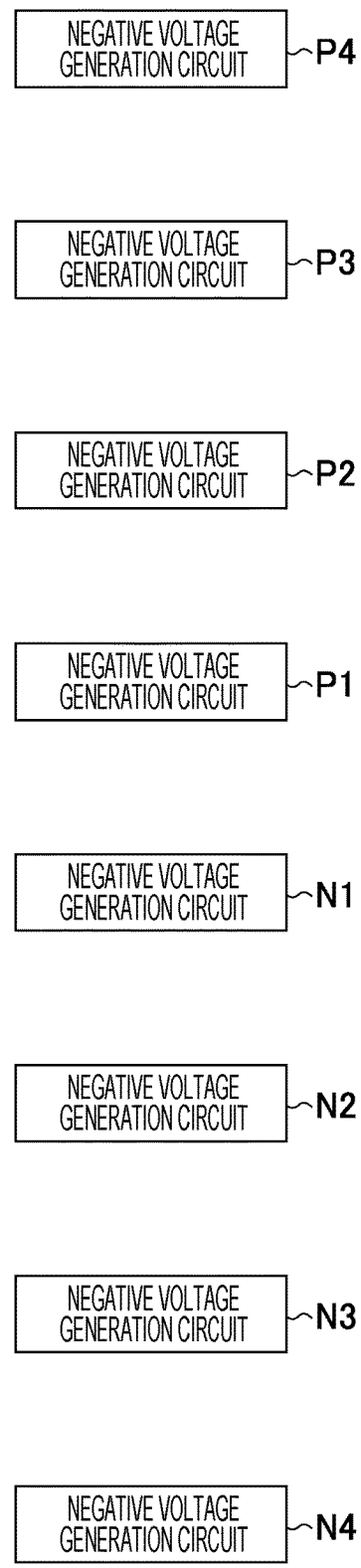

INTERNAL VOLTAGE GENERATION CIRCUIT

BACKGROUND

1. Field

The present disclosure relates to an internal voltage generation circuit that generates a predetermined voltage to be used in a circuit.

2. Description of the Related Art

Supply voltages to be used in various semiconductor circuits formed, for example, on a silicon substrate are determined by semiconductor processes used to manufacture semiconductor circuits and by specifications expected to be satisfied by semiconductor circuits. However, external power supplies outside a semiconductor circuit may be incapable of supplying appropriate supply voltages to be used in a semiconductor circuit. Consequently, when a supply voltage to be used in a semiconductor circuit is not supplied by an external power supply, the semiconductor circuit includes an on-board internal voltage generation circuit that generates an internal voltage to be used in the semiconductor circuit from the supply voltage of an external power supply.

For example, a solid-state imaging element of a complementary metal-oxide semiconductor (CMOS) type is known to operate as follows. In a solid-state imaging element, external light is converted into electrons, and the electrons are accumulated in a photodiode. The accumulation and transfer of electric charge generated in the photodiode are switched on and off by a gate, to which a negative voltage is applied. In this way, a solid-state imaging element avoids a situation in which electric charge in the vicinity of a substrate surface affects the photodiode.

However, if digital-processing semiconductors other than a solid-state imaging element of a CMOS type do not use a negative voltage, supplying the negative voltage described above from outside generally adds an unnecessary component to the entire system. In such a case, an internal voltage generation circuit is used to generate a voltage to be used in a semiconductor device from the supply voltage of an external power supply. Japanese Unexamined Patent Application Publication No. 9-163721 discloses as an internal voltage generation circuit of the related art a negative voltage generation circuit that uses a charge pump circuit.

The negative voltage generation circuit of the related art, which is disclosed in Japanese Unexamined Patent Application Publication No. 9-163721, has a configuration as depicted in FIG. 11A. FIG. 11A is a block diagram depicting a configuration of a negative voltage generation circuit of the related art. FIG. 11B depicts waveforms illustrating the relation between oscillator signals CLK1 and CLK2 depicted in FIG. 11A. Hereinafter, for the sake of brevity, the circuit depicted in FIG. 11A is called an internal voltage generation circuit, and a circuit constituted by a signal drive circuit 21 and a charge pump circuit 22 is called a negative voltage generation circuit.

An internal voltage generation circuit 101, which is depicted in FIG. 11A, includes an oscillator circuit 11, two negative voltage generation circuits P1 and N1, and an output control circuit 12. The negative voltage generation circuits P1 and N1 each include the signal drive circuit 21 and the charge pump circuit 22.

In the internal voltage generation circuit 101, the oscillator circuit 11 generates the oscillator signal CLK1 as a reference signal, the signal drive circuit 21 in the negative voltage generation circuit P1 operates in response to the oscillator signal CLK1, and the charge pump circuit 22 in the negative voltage generation circuit P1 operates, driven by the signal drive circuit 21. The oscillator circuit 11 generates the oscillator signal CLK2 simultaneously with the oscillator signal CLK1, where the oscillator signal CLK2 is a reference signal having a phase opposite to the phase of the oscillator signal CLK1. The signal drive circuit 21 in the negative voltage generation circuit N1 operates in response to the oscillator signal CLK2, and the charge pump circuit 22 in the negative voltage generation circuit N1 operates, driven by the signal drive circuit 21. The outputs from the two charge pump circuits 22 are input to the output control circuit 12. The output control circuit 12 controls the output voltage in accordance with the outputs from the two charge pump circuits 22 and supplies a current to an external circuit.

In general, in the charge pump circuit 22, a capacitor is electrically charged or discharged in synchronization with a high period or a low period of the oscillator signal depicted in FIG. 11B. The charging and discharging are repeated periodically, and periodic noise is generated. Thus, in the internal voltage generation circuit 101, as described above, the signal drive circuit 21 and the charge pump circuit 22 in the negative voltage generation circuit P1 are driven by an oscillator signal having a phase opposite to the phase of an oscillator signal by which the signal drive circuit 21 and the charge pump circuit 22 in the negative voltage generation circuit N1 are driven, so that the generation of the periodic noise is suppressed.

The size of the solid-state imaging device of a CMOS type has been increasing in recent years, and the increase in the number of pixels that form a screen has led to an increase in the amount of driving current. In response to such a request for the increase in the amount of driving current, it is desirable that the internal voltage generation circuit 101 suppress noise generated in accordance with an operation mode and supply a sufficient current to be used while keeping current consumption low.

An increase in the current supply capacity of the internal voltage generation circuit 101 that uses the charge pump circuit 22 formed on a semiconductor integrated circuit is realized by parallel connection of a plurality of negative voltage generation circuits P and N as depicted by an internal voltage generation circuit 102 depicted in FIG. 12A.

FIG. 12A is a block diagram depicting a configuration that enables an increase in current and a switching operation of current consumption in the internal voltage generation circuit 101 depicted in FIG. 11A. FIG. 12B illustrates the arrangement of the negative voltage generation circuits P1 to P4 and N1 to N4 depicted in FIG. 12A.

However, the internal voltage generation circuit 102 depicted in FIG. 12A has a drawback, as follows.

Each negative voltage generation circuit is paired with another negative voltage generation circuit, such as P1 and N1, P2 and N2, P3 and N3, and P4 and N4, and these combinations are constituted to nullify periodic noise. As the number of the negative voltage generation circuits P and N connected parallel to each other increases, the distance between a negative voltage generation circuit and another negative voltage generation circuit that form a pair increases as illustrated by L1, L2, L3, and L4 (L1<L2<L3<L4).

In a semiconductor integrated circuit, the charge pump circuits 22 and other circuits interfere with each other, and such interference causes, through a circuit board or wiring, variations in the supply voltage and the ground potential or temporal fluctuations or the like in a drive signal supplied to the charge pump circuit 22. In a semiconductor integrated circuit, such variations and fluctuations generate noise randomly distributed in time from around the charge pump circuit 22 and a time-invariant difference between the supply voltages for the charge pump circuits 22. The time-invariant difference between the supply voltages depends on the arrangement of the charge pump circuits 22. For example, if a supply voltage difference ΔV is generated between the negative voltage generation circuits P4 and N4, which are farthest apart, the voltages generated by the negative voltage generation circuits P4 and N4 vary due to the supply voltage difference.

In the internal voltage generation circuit 102 constituted in accordance with the existing technique, the distance between a negative voltage generation circuit P and a negative voltage generation circuit N that form a pair, which are combined to nullify periodic noise, increases as described above. In terms of the random noise and the supply voltage difference, such an increase in the distance reduces the noise suppression capability realized by pairing the negative voltage generation circuits P and N in the internal voltage generation circuit 102.

It is desirable to provide an internal voltage generation circuit that improves noise suppression capability in a configuration including pairs of negative voltage generation circuits for reducing noise.

SUMMARY

According to an aspect of the disclosure, there is provided an internal voltage generation circuit formed on a semiconductor integrated circuit, and the internal voltage generation circuit includes an oscillator circuit that generates an oscillator signal, a first voltage generation unit and a second voltage generation unit, each of which includes a charge pump circuit and a signal drive circuit that receives the oscillator signal and that generates one or more drive signals to drive the charge pump circuit, and an output control circuit that controls an output voltage that is output from the charge pump circuit. The first voltage generation unit and the second voltage generation unit are connected parallel to each other. The one or more drive signals are input in opposite phases to the charge pump circuit in the first voltage generation unit and to the charge pump circuit in the second voltage generation unit. A plurality of pairs of the first voltage generation unit and the second voltage generation unit are disposed, and the first voltage generation unit and the second voltage generation unit are located adjacent to each other.

BRIEF DESCRIPTION OF THE DRAWINGS

FIG. 12A is a block diagram depicting a configuration that enables an increase in current and a switching operation of current consumption in the internal voltage generation circuit depicted in FIG. 11A, and FIG. 12B illustrates the arrangement of the negative voltage generation circuits depicted in FIG. 12A.

DESCRIPTION OF THE EMBODIMENTS

First Embodiment

An embodiment of the present disclosure will be described below with reference to the drawings.

Configuration of Internal Voltage Generation Circuit

Figure 1A:
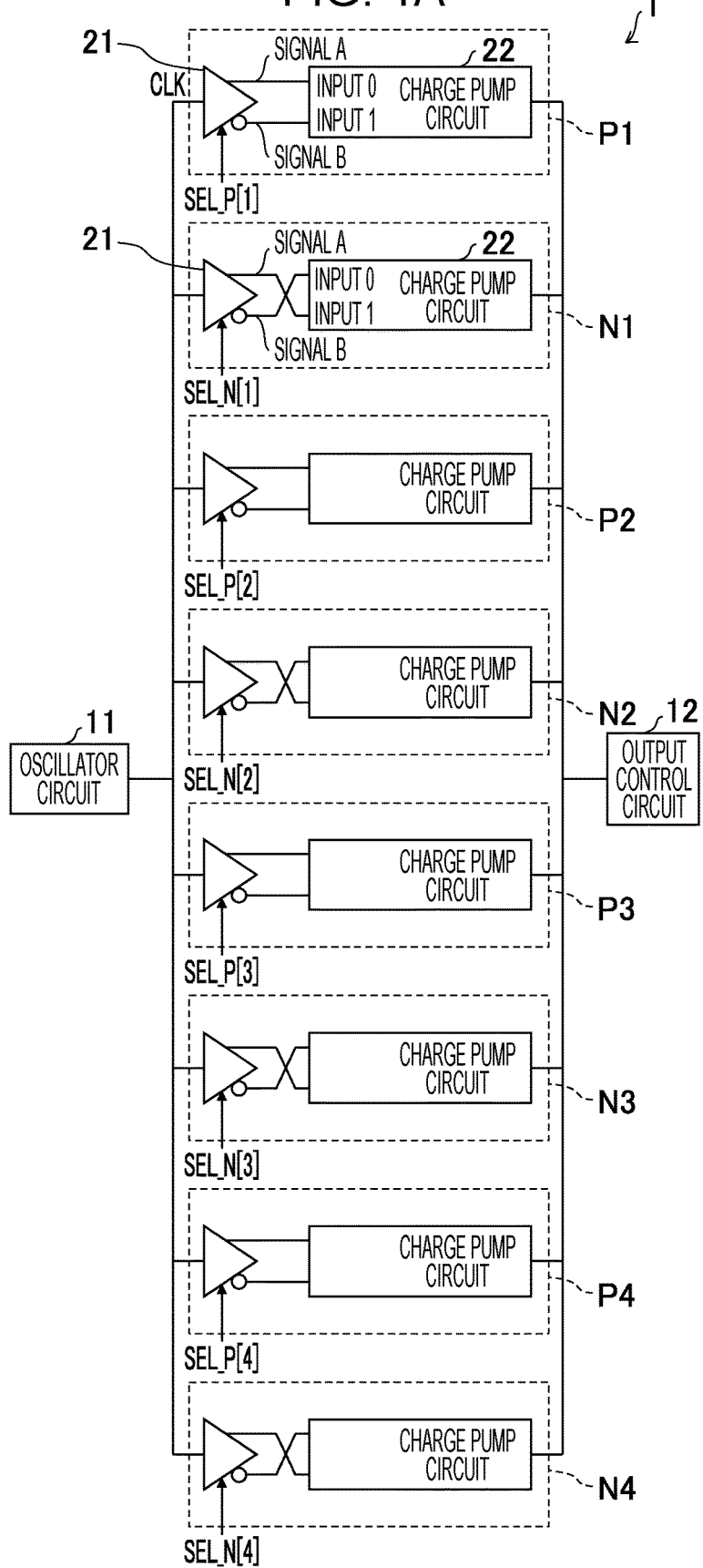
FIG. 1A is a block diagram depicting a configuration of an internal voltage generation circuit according to an embodiment of the present disclosure.
Figure 1B:
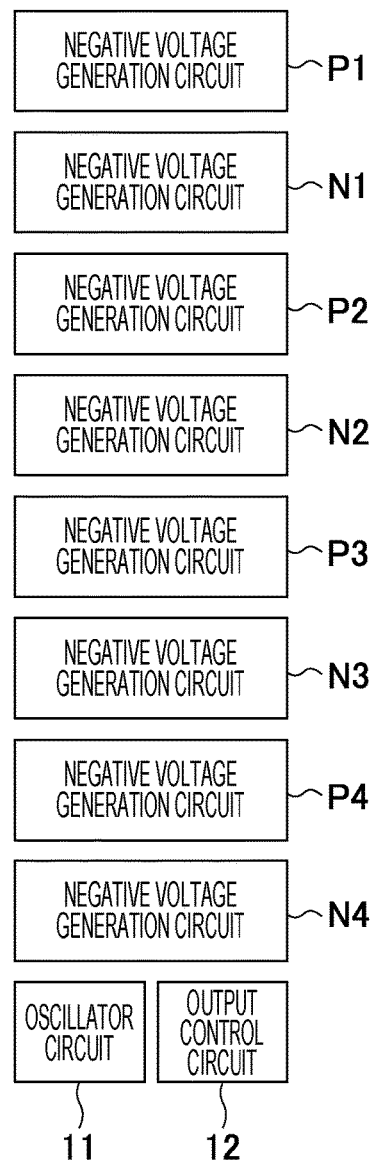
FIG. 1B illustrates the arrangement of negative voltage generation circuits depicted in FIG. 1A.

FIG. 1A is a block diagram depicting a configuration of an internal voltage generation circuit according to the present embodiment, and FIG. 1B illustrates the arrangement of negative voltage generation circuits P and N depicted in FIG. 1A.

The internal voltage generation circuit according to the present embodiment is a negative voltage generation circuit that generates a predetermined negative voltage to be used in a circuit and is formed on a semiconductor substrate. As depicted in FIG. 1A, an internal voltage generation circuit 1 includes an oscillator circuit 11, four negative voltage generation circuits P (P1 to P4, a first voltage generation unit), four negative voltage generation circuits N (N1 to N4, a second voltage generation unit), and an output, control circuit 12. The number of pairs of the negative voltage generation circuits P and N is not limited to 4, and any number more than 1 can be adopted. This feature is common to other embodiments described below.

The oscillator circuit 11 generates an oscillator signal CLK as a reference signal and outputs the generated oscillator signal CLK to all signal drive circuits 21 in the negative voltage generation circuits P and N.

Each of the negative voltage generation circuits P and a corresponding one of the negative voltage generation circuits N are connected parallel to each other, and the negative voltage generation circuits P and the negative voltage generation circuits N are alternately arranged between the oscillator circuit 11 and the output control circuit 12. Thus, the negative voltage generation circuits P and N are arranged in the order P1, N1, P2, N2, P3, N3, P4, and N4 as depicted in FIG. 1B.

Each of the negative voltage generation circuits P includes the signal drive circuit 21 and a charge pump circuit 22. The signal drive circuit 21 receives the oscillator signal CLK and generates a drive signal A and a drive signal B having a phase opposite to the phase of the drive signal A. The drive signal A is input to the input 0, which is one input terminal of the charge pump circuit 22, and the drive signal B is input to the input 1, which is the other input terminal of the charge pump circuit 22. The charge pump circuit 22 generates a predetermined negative voltage in response to the drive signals A and B received from the signal drive circuit 21.

Similarly to the negative voltage generation circuits P, each of the negative voltage generation circuits N includes the signal drive circuit 21 and the charge pump circuit 22, and the signal drive circuit 21 generates the drive signals A and B. However, in contrast to the negative voltage generation circuit P, the drive signal A is input to the input 1 of the charge pump circuit 22, and the drive signal B is input to the input 0 of the charge pump circuit 22 in the negative voltage generation circuit N.

Control signals SEL_P[1], SEL_P[2], SEL_P[3], and SEL_P [4] are input to the signal crave circuits 21 in the negative voltage generation circuit P1, P2, P3, and P4, respectively, and an active and inactive states of the signal drive circuits 21 are switched, leading to switching between an active and inactive states of the negative voltage generation circuits P1 to P4. Similarly, control signals SEL_N[1], SEL_N[2], SEL_N[3], and SEL_N[4] are input to the signal drive circuits 21 in the negative voltage generation circuits N1, N2, N3, and N4, respectively, and an active and inactive states of the signal drive circuits 21 are switched, leading to switching between an active and inactive states of the negative voltage generation circuits N1 to N4.

The output control circuit 12 receives outputs from the negative voltage generation circuits P and N, adjusts the output voltage of the outputs from the negative voltage generation circuits P and N to a predetermined voltage, and generates a voltage to be supplied to another circuit.

Operation and Benefit of Internal Voltage Generation Circuit

Figure 2A:
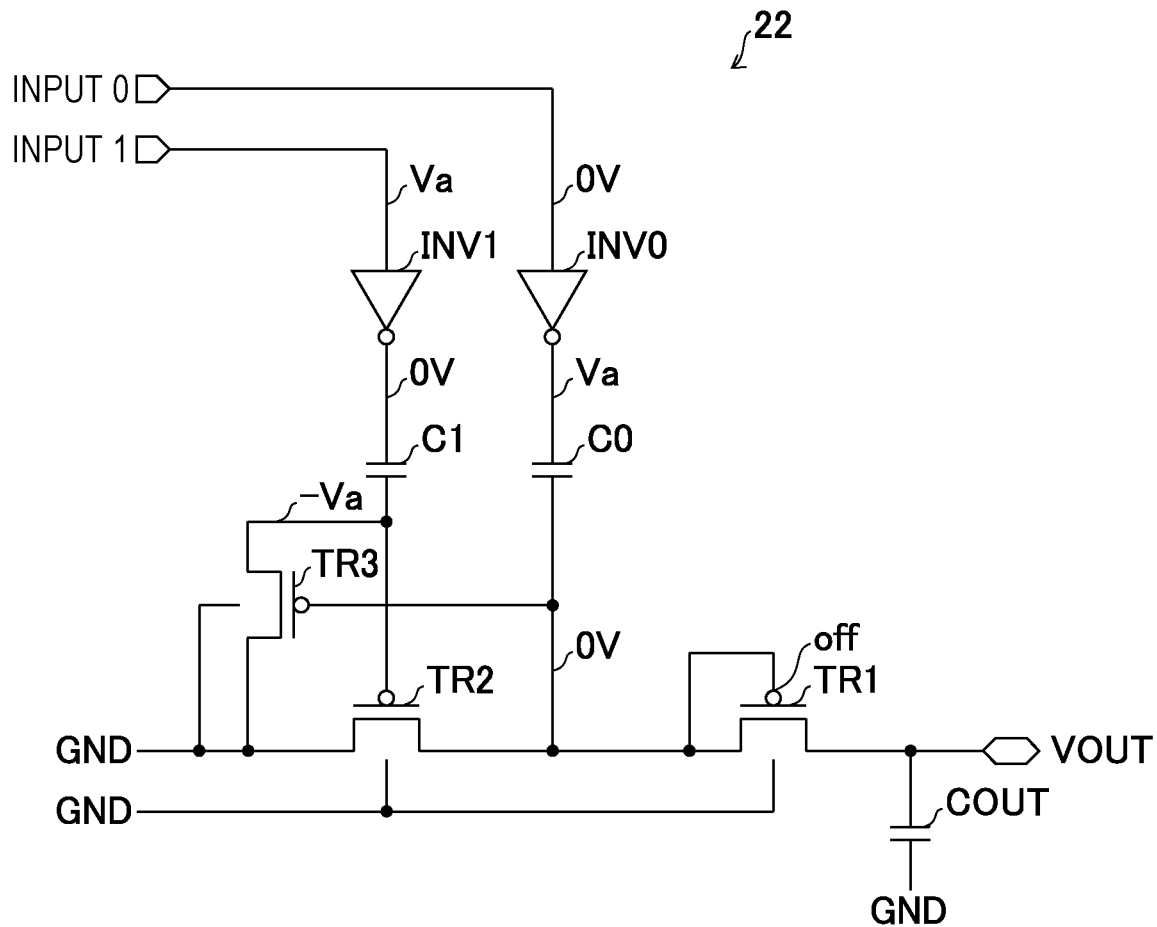
FIG. 2A is a circuit diagram of an example charge pump circuit in one of the negative voltage generation circuits depicted in FIG. 1A and illustrates a state of the charge pump circuit at the time point T0, which is depicted in the input signal waveforms in FIG. 2B.
Figure 2B:
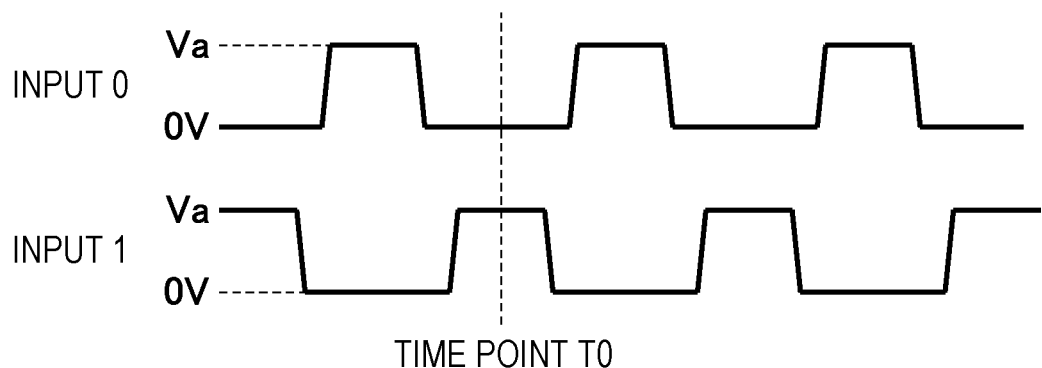
FIG. 2B depicts waveforms of signals that are input to the input 0 and the input 1 of the charge pump circuit depicted in FIG. 2A.
Figure 3A:
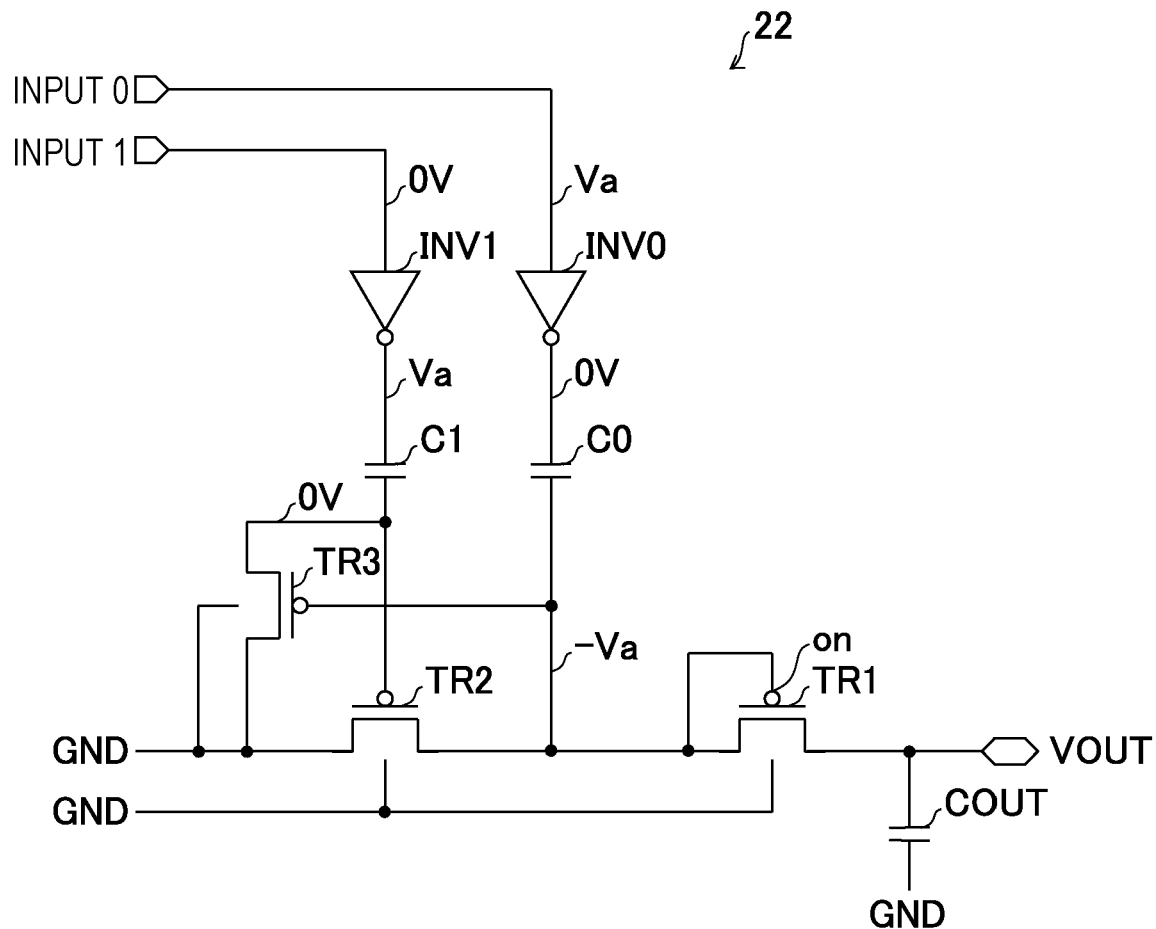
FIG. 3A is a circuit diagram of the charge pump circuit and illustrates a state of the charge pump circuit at the time point T1, which is depicted in the input signal waveforms in FIG. 3B.

Operation. of the internal voltage generation circuit 1 in the above configuration will be described below. FIG. 2A is a circuit diagram of an example charge pump circuit 22 in one of the negative voltage generation circuits P depicted in FIG. 1A and illustrates a state of the charge pump circuit 22 at the time point T0, which is depicted in the input signal waveforms in FIG. 2B, and FIG. 2B depicts waveforms of signals that are input to the input 0 and the input 1 of the charge pump circuit 22 depicted in FIG. 2A. FIG. 3A is a circuit diagram of the charge pump circuit 22 and illustrates a state of the charge pump circuit 22 at the time point T1, which is depicted in the input signal waveforms in FIG. 3B, and FIG. 3B depicts waveforms of signals that are input to the input 0 and the input 1 of the charge pump circuit 22 depicted in FIG. 3A.

As depicted in FIG. 2B, input signals (drive signals) that are input to the charge pump circuit 22 from the signal drive circuit 21 vary periodically from 0 V to Va V. In this case, the input voltages at the input 0 and at the input 1 of the charge pump circuit 22 are 0 V and Va V, respectively, at the time point T0 depicted in FIG. 2B, and the state of each node is depicted in FIG. 2A. In FIGS. 2A and 3A, INV0 and INV1 denote inverters, C1, C0, and COUT denote capacitors, and TR1, TR2, and TR3 denote p-channel metal-oxide semiconductor (PMOS) transistors.

In FIG. 2A, the input signals to the input 0 and the input 1 are inverted by the inverters INV0 and INV1, respectively. In the state depicted in FIG. 2A, the transistors TR1 and TR3 are in the off state, and the transistor TR2 is in the on state. In this state, since the transistor TR1 is in the off state, a signal (electric charge) accumulated in the capacitor COUT is being discharged toward an external load via the output VOUT of the charge pump circuit 22.

Figure 3B:
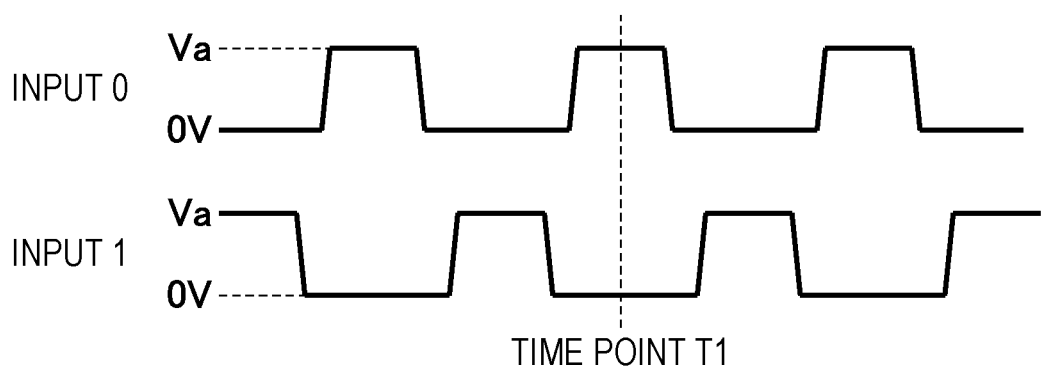
FIG. 3B depicts waveforms of signals that are input to the input 0 and the input 1 of the charge pump circuit depicted in FIG. 3A.

FIG. 3A depicts a state in the charge pump circuit 22 at the time point T1 when the input voltages at the input 0 and at the input 1 become Va V and 0 V, respectively, as depicted in FIG. 3B after the input signals (drive signals) at the input 0 and at the input 1 change from the state in FIG. 2A. At this time point, the transistors TR1 and TR3 are in the on state, and the transistor TR2 is in the off state. When the state at the time point T0 transitions to the state at the time point T1, the output of the inverter INV0 changes from Va V to 0 V, and the output via the capacitor C0 changes from 0 V to −Va V. At this time point, since the transistor TR1 is in the on state, a negative voltage appears at the output VOUT, and electric charge due to this voltage is accumulated in the capacitor COUT.

In the negative voltage generation circuit P, the charge pump circuit 22 switches successively between the state in FIG. 2A and the state in FIG. 3A, as described above, and repeated switching generates a negative voltage. Thus, periodically varying noise as generated in the output voltage of the negative voltage generation circuit P due to an operation of charging and discharging capacitors in the charge pump circuit 22 and a clock operation of the entire circuit. This feature is common to the negative voltage generation circuit N.

In contrast to the negative voltage generation circuit P, the drive signal A is input to the input 1 of the charge pump circuit 22, and the drive signal B is input to the input 0 of the charge pump circuit 22 in the negative voltage generation circuit N. Consequently, the negative voltage generated by the negative voltage generation circuit N has a phase opposite to the phase of the negative voltage generated by the negative voltage generation circuit P.

Variations in the supply voltage and the ground potential of a semiconductor integrated circuit and temporal fluctuations in the drive signal supplied to the charge pump circuit 22 have certain distributions through the semiconductor substrate and the metal wiring layers and are transmitted while varying in time. Consequently, if the negative voltage generation circuits P and N are located close to each other in the internal voltage generation circuit 1, the negative voltage generation circuits P and N are subjected to a similar effect of such variations and fluctuations at any time and position and, as a result, generate voltage variations that are nearly equal to each other in magnitude and that have opposite phases.

In the internal voltage generation circuit 1 according to the present embodiment, as depicted in FIGS. 1A and 1B, the negative voltage generation circuit P and the negative voltage generation circuit N that form a pair are located adjacent to each other in the arrangement direction of the negative voltage generation circuits N and P. This arrangement increases the capability of suppression of noise in the internal voltage generation circuit 1.

For example, when the supply voltage varies in the arrangement direction of the negative voltage generation circuits P and N depicted in FIG. 1B, supply voltage differences, which are due to variations in the supply voltage, between the negative voltage generation circuits P and N adjacent to each other are small all the time, and noise generation can be suppressed effectively.

Configuration of Changed Negative Voltage Generation Circuits that Are Active

Figure 4A:
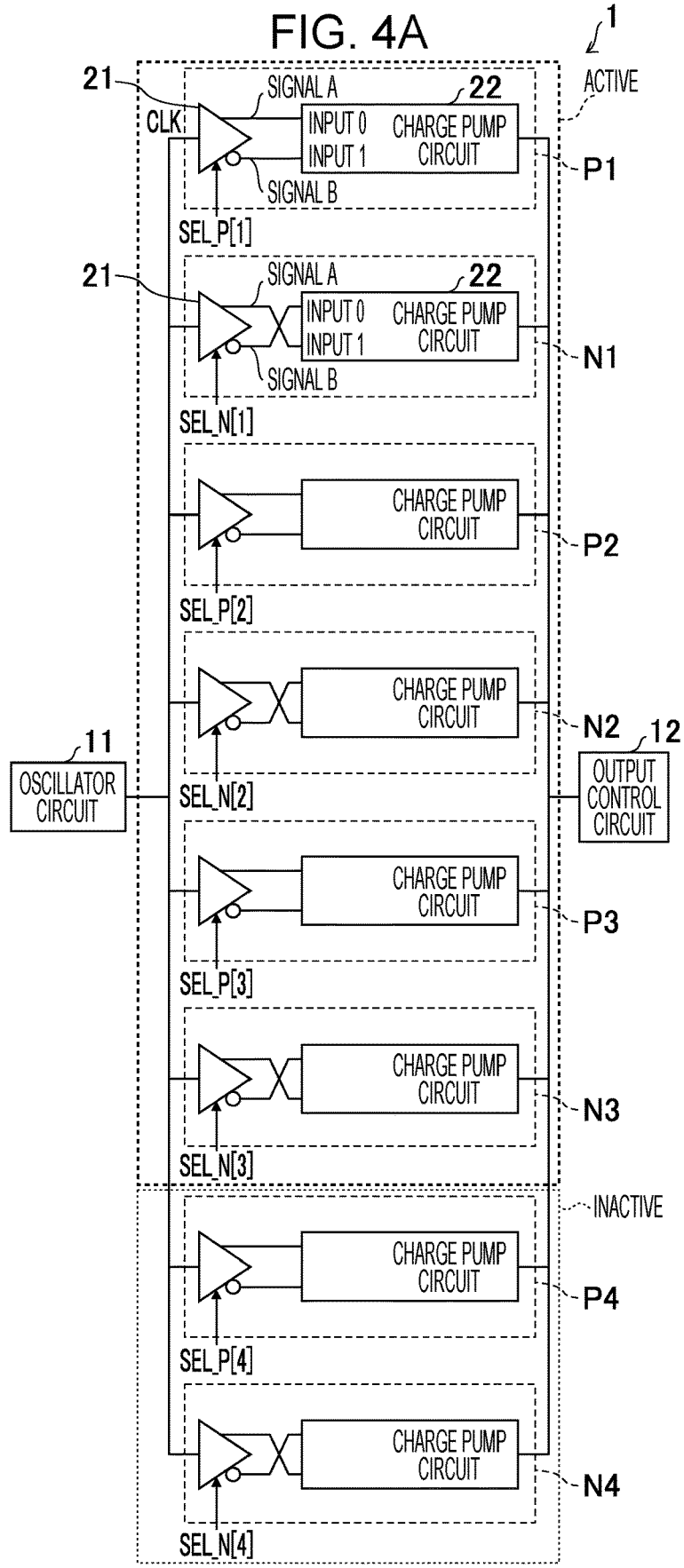
FIG. 4A is a block diagram of the internal voltage generation circuit depicted in FIG. 1A and depicts a state in which negative voltage generation circuits that are active among the negative voltage generation circuits in the internal voltage generation circuit are changed.
Figure 4B:
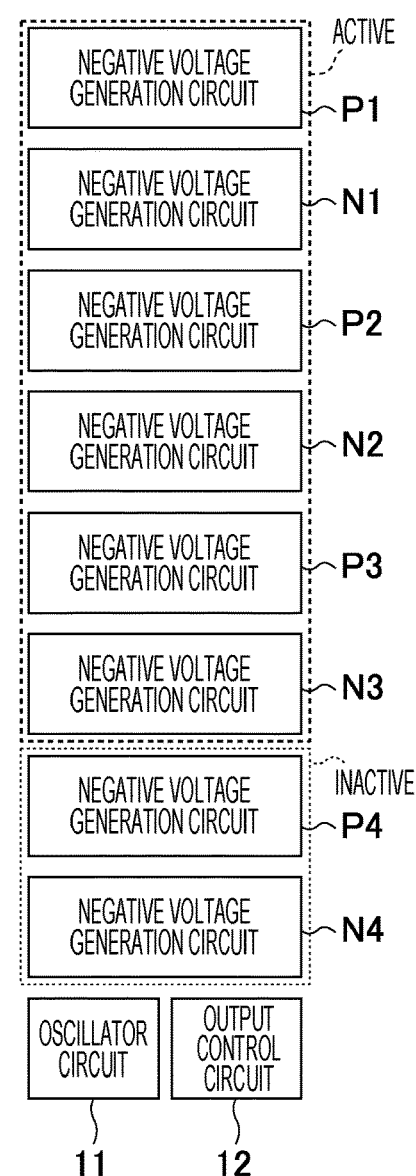
FIG. 4B illustrates the arrangement of the negative voltage generation circuits depicted in FIG. 4A and the state in which negative voltage generation circuits that are active are changed.

FIG. 4A is a block diagram of the internal voltage generation circuit 1 and depicts a state in which negative voltage generation circuits P and N that are active among the negative voltage generation circuits P and N in the internal voltage generation circuit 1 are changed, and FIG. 4B illustrates the arrangement of the negative voltage generation circuits P and N depicted in FIG. 4A and the state in which negative voltage generation circuits P and N that are active are changed.

When a small amount of current consumption for a negative voltage generated in the internal voltage generation circuit 1 depicted in FIGS. 1A and 1B is sufficient, for example, when the current to be consumed is equal to ¾ or less of the total current for the negative voltage generated in the internal voltage generation circuit 1, only three pairs of the negative voltage generation circuits P (P1 to P3) and N (N1 to N3) are activated as depicted in FIGS. 4A and 4B. In this case, noise generated in the entire internal voltage generation circuit 1 can further be reduced because the current supplied by the internal voltage generation circuit 1 decreases.

In addition, in the operation state of the internal voltage generation circuit 1 depicted in FIGS. 4A and 4B, the negative voltage generation circuits P4 and N4, which are inactive, are present between an external circuit and the negative voltage generation circuit N3, which is located at one end of the arrangement of the negative voltage generation circuits P1 to P3 and N1 to N3, which are active. Thus, in the operation state depicted in FIGS. 4A and 4B, there is an increase in the distance between the negative voltage generation circuits P1 to P3 and N1 to N3, which are active, and an external circuit adjacent to the negative voltage generation circuit N4, which is inactive. This arrangement can reduce both of the effect of external circuits on the negative voltage generation circuits P and N and the effect of the negative voltage generation circuits P and N on external circuits.

Figure 5A:
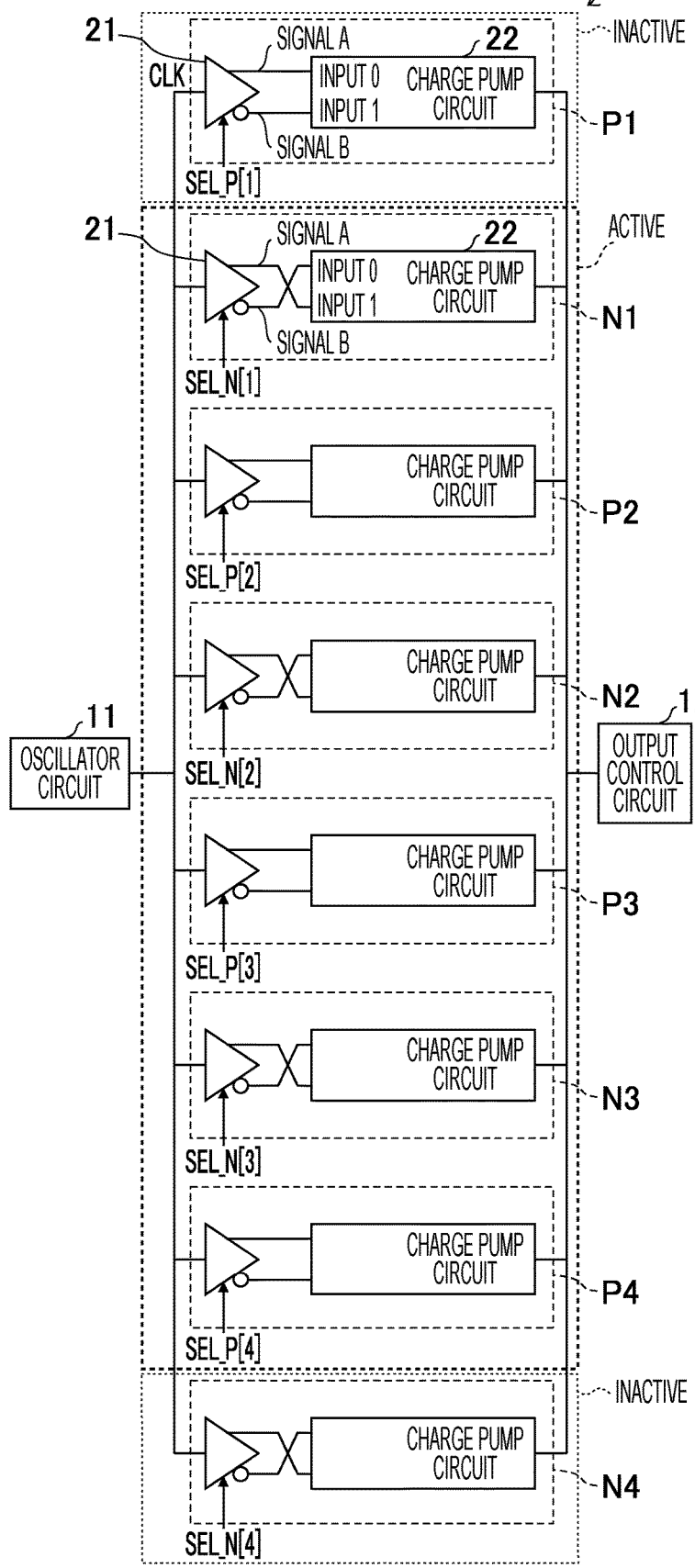
FIG. 5A is a block diagram of the internal voltage generation circuit depicted in FIG. 1A and depicts another state in which negative voltage generation circuits that are active among the negative voltage generation circuits in the internal voltage generation circuit are changed.
Figure 5B:
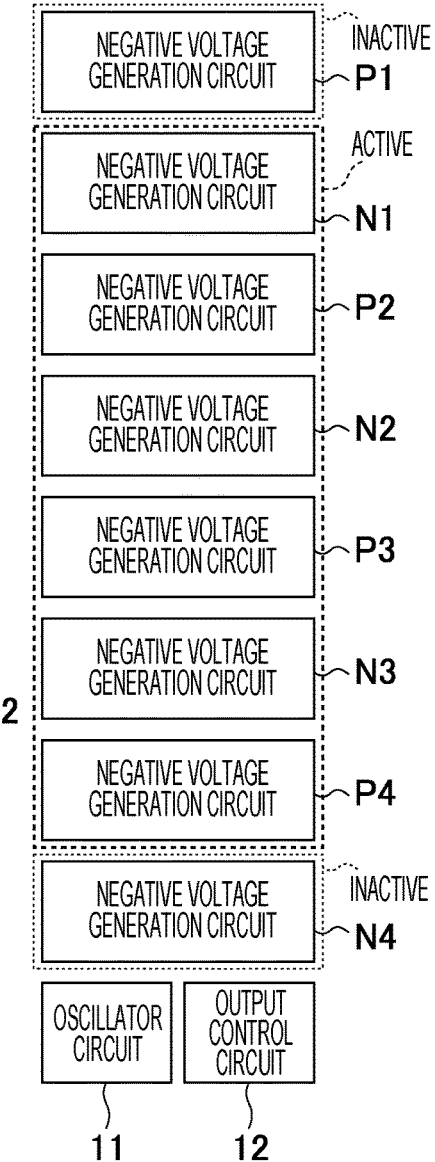
FIG. 5B illustrates the arrangement of the negative voltage generation circuits depicted in FIG. 5A and the state in which negative voltage generation circuits that are active are changed.

Another Configuration of Changed Negative Voltage Generation Circuits that Are Active FIG. 5A is a block diagram of the internal voltage generation circuit 1 and depicts another state in which negative voltage generation circuits P and N that are active among the negative voltage generation circuits P and N in the internal voltage generation circuit 1 are changed, and FIG. 5B illustrates the arrangement of the negative voltage generation circuits P and N depicted in FIG. 5A and the state in which negative voltage generation circuits P and N that are active are changed.

The negative voltage generation circuits P1 to P4 in the internal voltage generation circuit 1 all generate the same voltage, and, similarly, the negative voltage generation circuits N1 to N4 all generate the same voltage. Thus, when only three pairs of the negative voltage generation circuits P and N are to be activated, only the negative voltage generation circuits P2 to P4 and N1 to N3 may be activated as depicted in FIGS. 5A and 5B.

In this case, the negative voltage generation circuit P1, which is inactive, is present between an external circuit and the negative voltage generation circuit N1 located at one end of the arrangement of the negative voltage generation circuits P2 to P4 and N1 to N3, which are active, and the negative voltage generation circuit N4, which is inactive, is present between an external circuit and the negative voltage generation circuit P4 located at the other end. Thus, in the case depicted in FIGS. 5A and 5B, there is an increase in the distances between the negative voltage generation circuits P2 to P4 and N1 to N3, which are active, and external circuits. This arrangement can reduce both of the effect of external circuits, such as noise, on the negative voltage generation circuits P and N and the effect of the negative voltage generation circuits P and N, such as noise, on external circuits.

Second Embodiment

Another embodiment of the present disclosure will be described below with reference to the drawings. For the sake of brevity, components having functions that are the same as or similar to the functions of the components described in the above embodiment are denoted by the same numerals or symbols and are not repeatedly described herein.

Configuration of Internal Voltage Generation Circuit

Figure 6A:
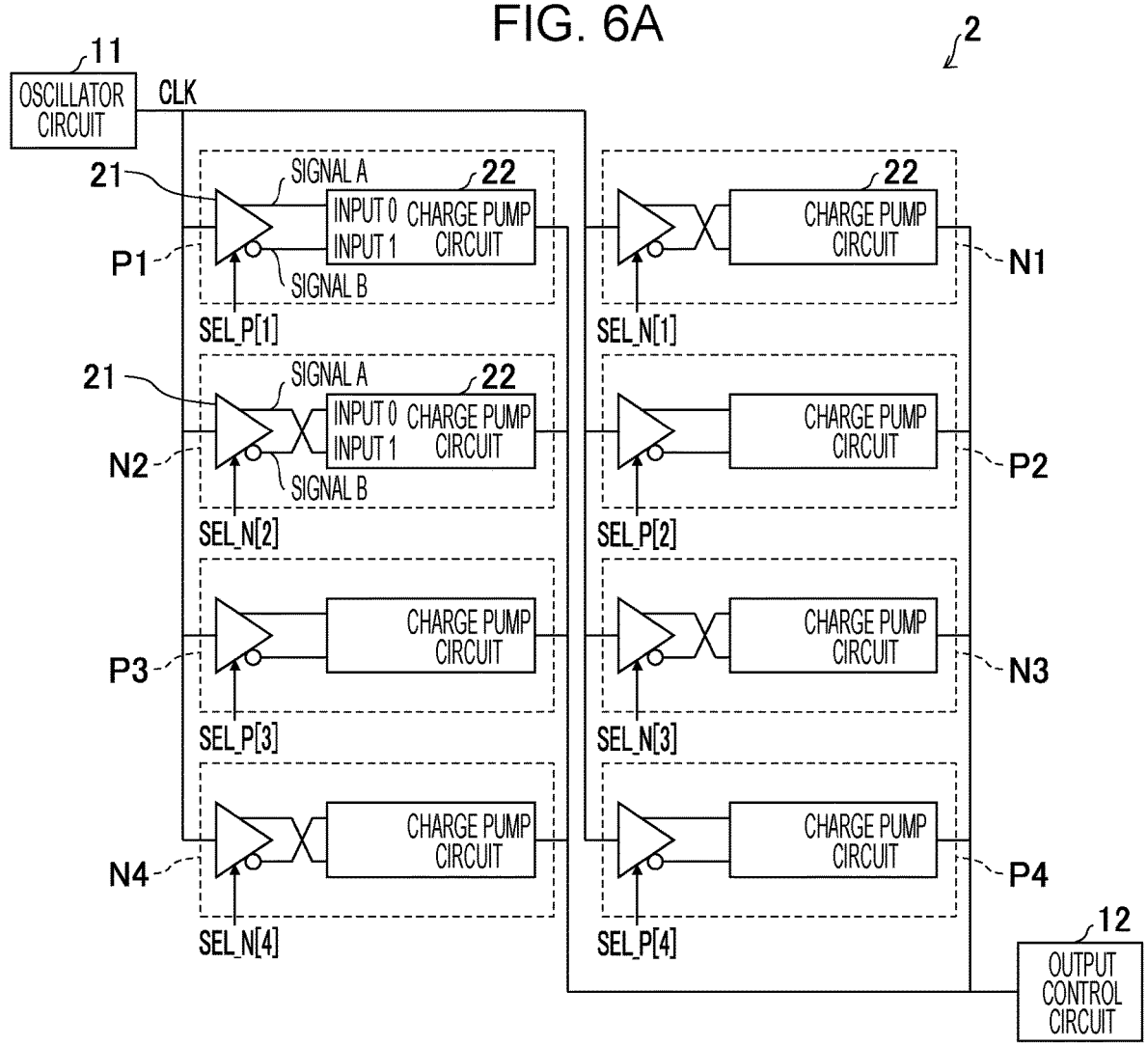
FIG. 6A is a block diagram depicting a configuration of an internal voltage generation circuit according to another embodiment of the present disclosure.
Figure 6B:
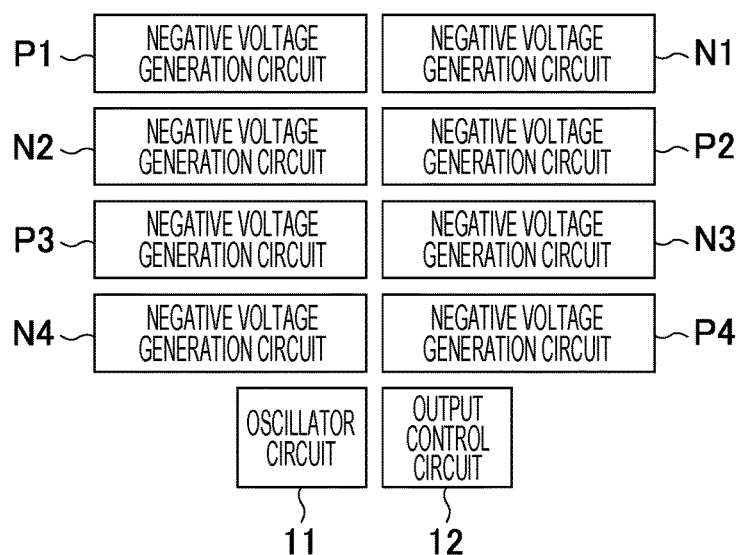
FIG. 6B illustrates the arrangement of negative voltage generation circuits depicted in FIG. 6A.

FIG. 6A is a block diagram depicting a configuration of an internal voltage generation circuit according to the present embodiment, and FIG. 6B illustrates the arrangement of negative voltage generation circuits P and N depicted in FIG. 6A.

Similarly to the internal voltage generation circuit 1 described above, an internal voltage generation circuit 2 according to the present embodiment includes an oscillator circuit 11, four negative voltage generation circuits P (P1 to P4), four negative voltage generation circuits N (N1 to N4), and an output control circuit 12 as depicted in FIG. 6A. The negative voltage generation circuits P1 to P4 and N1 to N4 are divided into two groups and arranged in the first column (vertical arrangement in FIG. 6A) and in the second column.

Specifically, the negative voltage generation circuits P1, N2, P3, and N4 are arranged in this order in the first column, and the negative voltage generation circuits N1, P2, N3, and P4 are arranged in this order in the second column. The negative voltage generation circuits P1 and N1 are arranged in the first row (horizontal arrangement in FIG. 6A), the negative voltage generation circuits N2 and P2 are arranged in the second row, the negative voltage generation circuits P3 and N3 are arranged in the third row, and the negative voltage generation circuits N4 and P4 are arranged in the fourth row. Thus, the negative voltage generation circuits P and the negative voltage generation circuits N are arranged alternately in the column direction and in the row direction.

Operation and Benefit of Internal Voltage Generation Circuit

The operation of generating a negative voltage in the internal voltage generation circuit 2 is the same as or similar to the operation described regarding the internal voltage generation circuit 1 and will not be described.

As described in the first embodiment above, the negative voltage generation circuits P and N are subjected to noise due to the variations in the supply voltage of an external power supply and the like, and the noise is transmitted through the substrate and wiring. Thus, as the distance between a negative voltage generation circuit P and a negative voltage generation circuit N located adjacent to the negative voltage generation circuit P decreases, the difference between the supply voltages for the negative voltage generation circuit P and the negative voltage generation circuit N decreases, and voltage noise generated in the internal voltage generation circuit 2 is suppressed.

Specifically, when the supply voltage varies in the column direction (for example, from top to bottom in FIG. 6B) in the internal voltage generation circuit 2 depicted in FIG. 6B, the negative voltage generation circuits P1 and N1, which form a pair, are subjected to a similar effect of the variation in the supply voltage, so are the negative voltage generation circuits N2 and P2, the negative voltage generation circuits P3 and N3, and the negative voltage generation circuits N4 and P4. This arrangement increases the capability of suppression of noise caused by the variations in the supply voltage in the internal voltage generation circuit 2.

Further, when the supply voltage varies in the row direction (for example, from left to right in FIG. 6E) in the internal voltage generation circuit 2, the negative voltage generation circuits P1 and N2, which form a pair, are subjected to a similar effect of the variation in the supply voltage, so are the negative voltage generation circuits N1 and P2, the negative voltage generation circuits P3 and N4, and the negative voltage generation circuits N3 and P4. This arrangement similarly increases the capability of suppression of noise caused by the variations in the supply voltage in the internal voltage generation circuit 2.

Configuration of Changed Negative Voltage Generation Circuits that Are Active

Figure 7A:
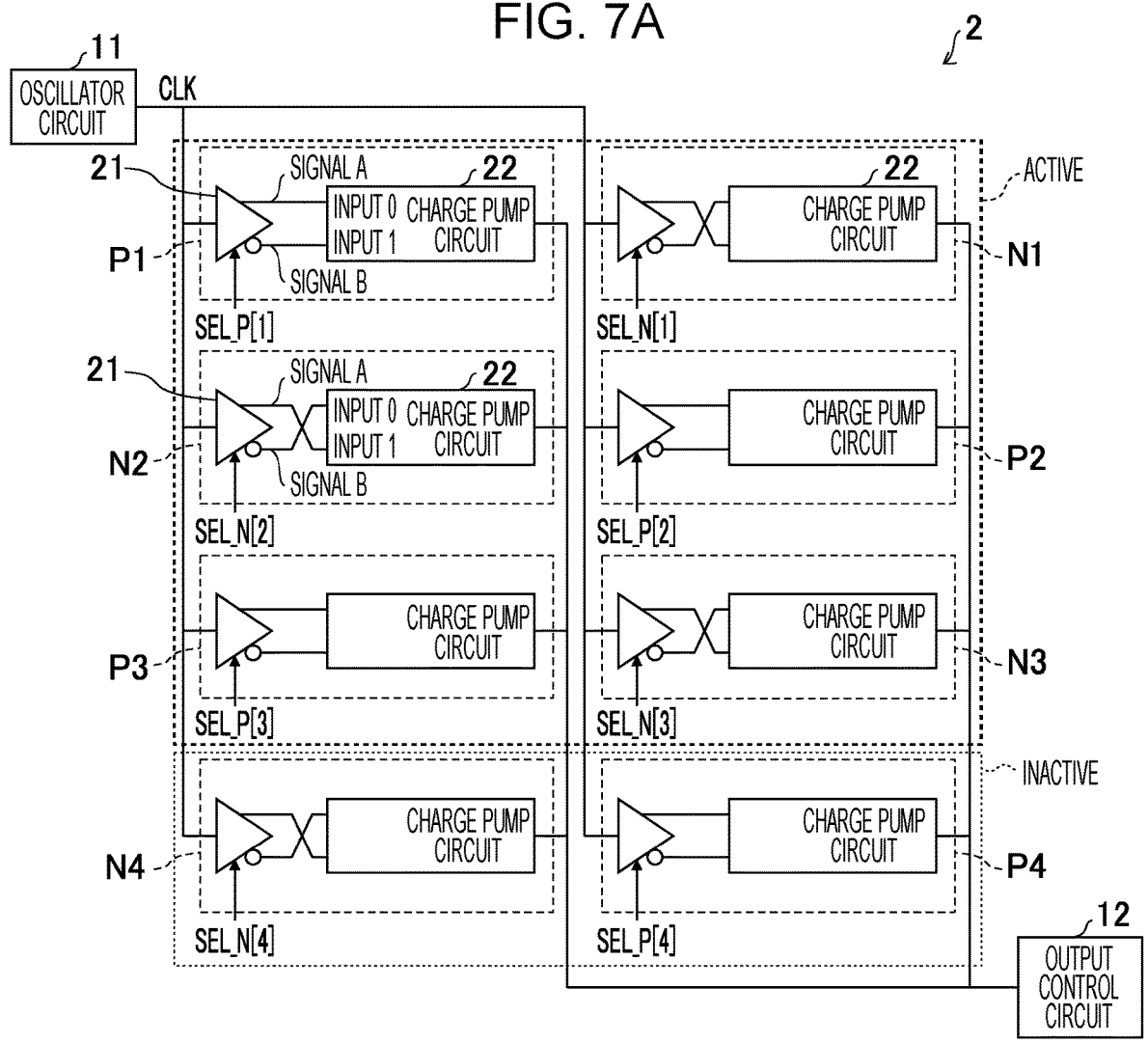
FIG. 7A is a block diagram of the internal voltage generation circuit depicted in FIG. 6A and depicts a state in which negative voltage generation circuits that are active among the negative voltage generation circuits in the internal voltage generation circuit are changed.
Figure 7B:
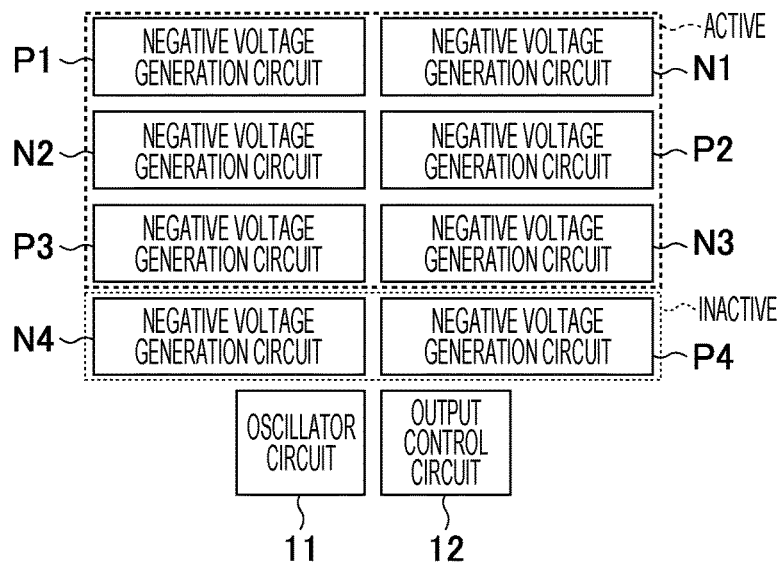
FIG. 7B illustrates the arrangement of the negative voltage generation circuits depicted in FIG. 7A and the state in which negative voltage generation circuits that are active are changed.

FIG. 7A is a block diagram of the internal voltage generation circuit 2 and depicts a state in which negative voltage generation circuits P and N that are active among the negative voltage generation circuits P and N in the Internal voltage generation circuit 2 are changed, and FIG. 7B illustrates the arrangement of the negative voltage generation circuits P and N depicted in FIG. 7A and the state in which negative voltage generation circuits P and N that are active are changed.

When a small amount of current consumption for a negative voltage generated in the internal voltage generation circuit 2 depicted in FIGS. 6A and 6B is sufficient, for example, when the current to be consumed is equal to ¾ or less of the total current for the negative voltage generated in the internal voltage generation circuit 2, similarly to the case depicted in FIGS. 4A and 4B, only three pars of the negative voltage generation circuits P (P1 to P3) and N (N1 to N3) are activated as depicted in FIGS. 7A and 7B. In this case, noise generated in the entire internal voltage generation circuit 2 can further be reduced because the current supplied by the internal voltage generation circuit 2 decreases.

In addition, in the operation state of the internal voltage generation circuit 2 depicted in FIGS. 7A and 7B, the negative voltage generation circuits N4 and P4, which are inactive, are present between an external circuit and the negative voltage generation circuits P3 and N3, which are located at one end of the arrangement of the negative voltage generation circuits P1 to P3 and N1 to N3, which are active. Thus, in the operation state depicted in FIGS. 7A and 7B, there is an increase in the distance between the negative voltage generation circuits P1 to P3 and N1 to N3, which are active, and an external circuit adjacent to the negative voltage generation circuits N4 and P4, which are inactive. This arrangement can reduce both of the effect of external circuits on the negative voltage generation circuits P and N and the effect of the negative voltage generation circuits P and N on external circuits.

Figure 8A:
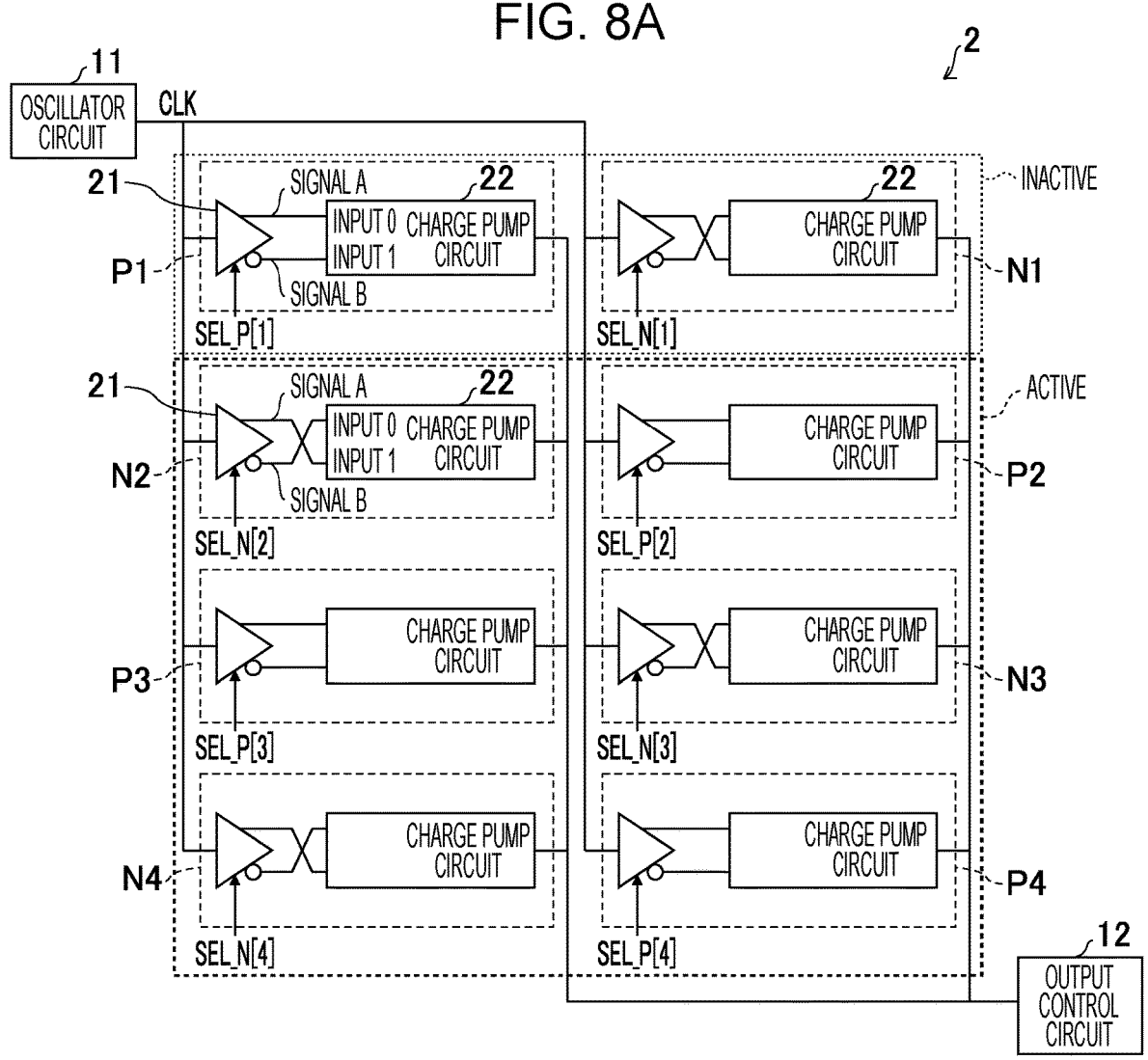
FIG. 8A is a block diagram of the internal voltage generation circuit depicted in FIG. 6A and depicts another state in which negative voltage generation circuits that are active among the negative voltage generation circuits in the internal voltage generation circuit are changed.
Figure 8B:
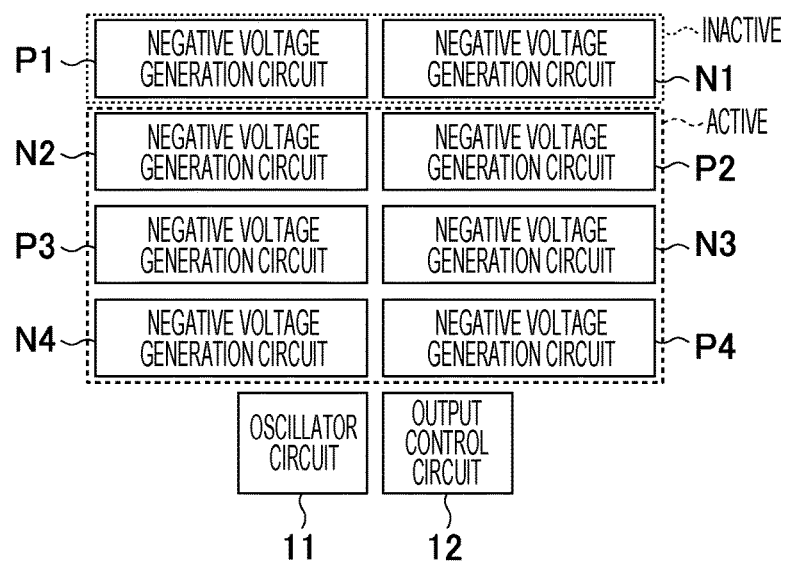
FIG. 8B illustrates the arrangement of the negative voltage generation circuits depicted in FIG. 8A and the state in which negative voltage generation circuits that are active are changed.

Another Configuration of Changed Negative Voltage Generation Circuits that Are Active FIG. 8A is a block diagram of the internal voltage generation circuit 2 and depicts another state in which negative voltage generation circuits P and N that are active among the negative voltage generation circuits P and N in the internal voltage generation circuit 2 are changed, and FIG. 8B illustrates the arrangement of the negative voltage generation circuits a and N depicted in FIG. 8A and the state in which negative voltage generation circuits P and N that are active are changed.

In the operation state of the internal voltage generation circuit 2 depicted in FIGS. 8A and 8B, only three pairs of the negative voltage generation circuits P (P2 to P4) and N (N2 to N4) are activated. Similarly to the operation state of the internal voltage generation circuit 2 depicted in FIGS. 7A and 7B, noise generated in the entire internal voltage generation circuit 2 can further be reduced because the current supplied by the internal voltage generation circuit 2 decreases in the operation state of the internal voltage generation circuit 2 depicted in FIGS. 8A and 8B.

Similarly to the operation state depicted in FIGS. 7A and 7B, there is an increase in the distance between the negative voltage generation circuit P2 to P4 and N2 to N4, which are active, and an external circuit adjacent to the negative voltage generation circuits P1 and N1, which are inactive, in the operation state depicted in FIGS. 8A and 8B. This arrangement can reduce both of the effect of external circuits on the negative voltage veneration circuits P and N and the effect of the negative voltage generation circuits P and N on external circuits.

Third Embodiment

Still another embodiment of the present disclosure will be described below. For the sake of brevity, components having functions that are the same as or similar to the functions of the components described in the above embodiments are denoted by the same numerals or symbols and are not repeatedly described herein.

Configuration of Internal Voltage Generation Circuit

Figure 9:
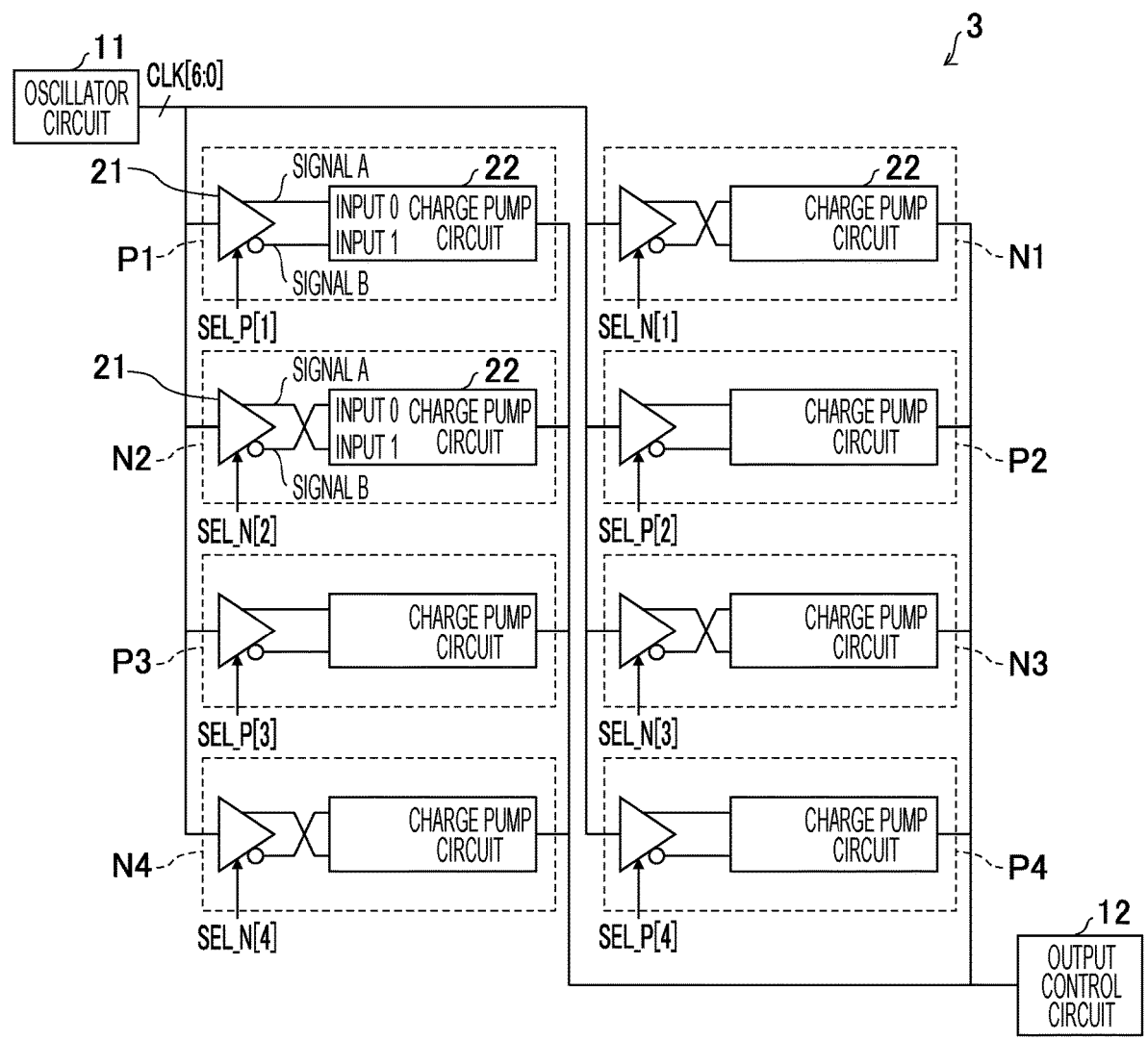
FIG. 9 is a block diagram depicting a configuration of an internal voltage generation circuit according to still another embodiment of the present disclosure.
Figure 10A:
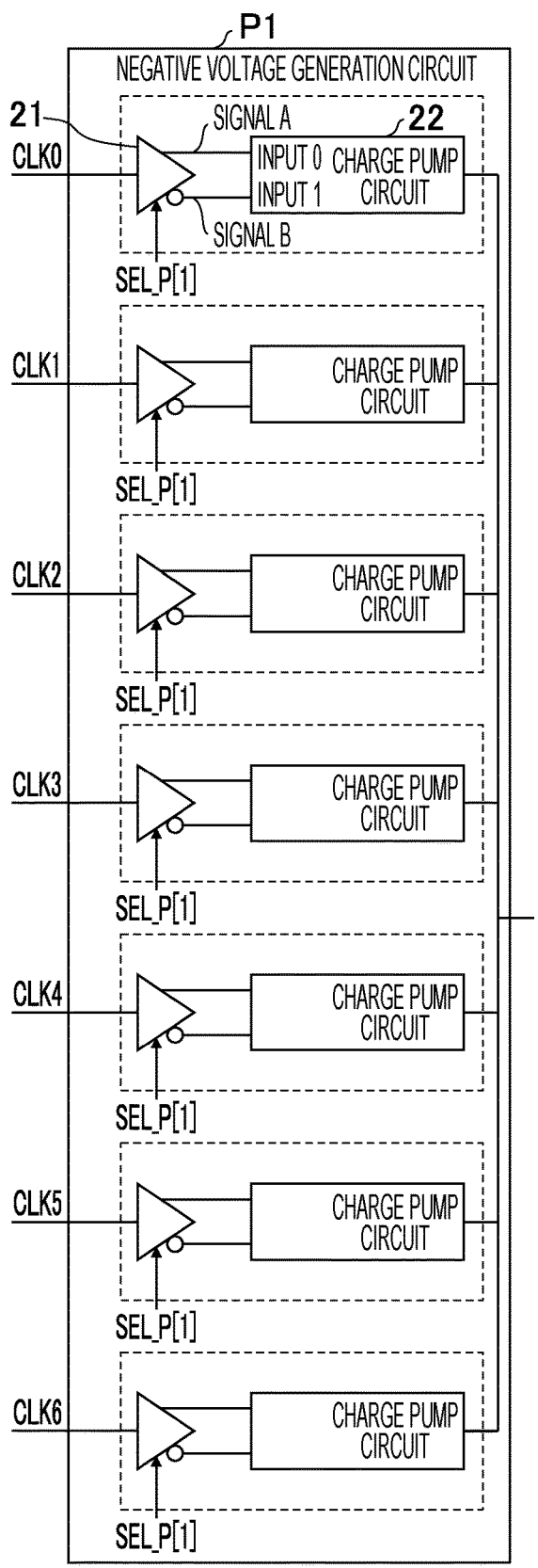
FIG. 10A depicts a state in which oscillator signals having different phases are successively input to a negative voltage generation circuit depicted in FIG. 9 from an oscillator circuit, and FIG. 10B depict waveforms of the oscillator signals depicted in FIG. 10A.

FIG. 9 is a block diagram depicting a configuration of an internal voltage generation circuit according to the present embodiment. As an example, FIG. 10A depicts a state in which oscillator signals CLK0 to CLK6 having different phases are input to the negative voltage generation circuit P1 depicted in FIG. 9 from an oscillator circuit 11, and FIG. 10B depict waveforms of the oscillator signals CLK0 to CLK6 depicted in FIG. 10A.

Similarly to the internal voltage generation circuit 2 depicted in FIGS. 6A and 6B, an internal voltage generation circuit 3 according to the present embodiment includes the oscillator circuit 11, four negative voltage generation circuits P (P1 to P4), four negative voltage generation circuits N (N1 to N4), and an output control circuit 12 as depicted in FIG. 9. The arrangement of the negative voltage generation circuits P1 to P4 and N1 to N4 is the same as or similar to the arrangement of the negative voltage generation circuits P1 to P4 and N1 to N4 depicted in FIG. 6A.

Figure 10B:
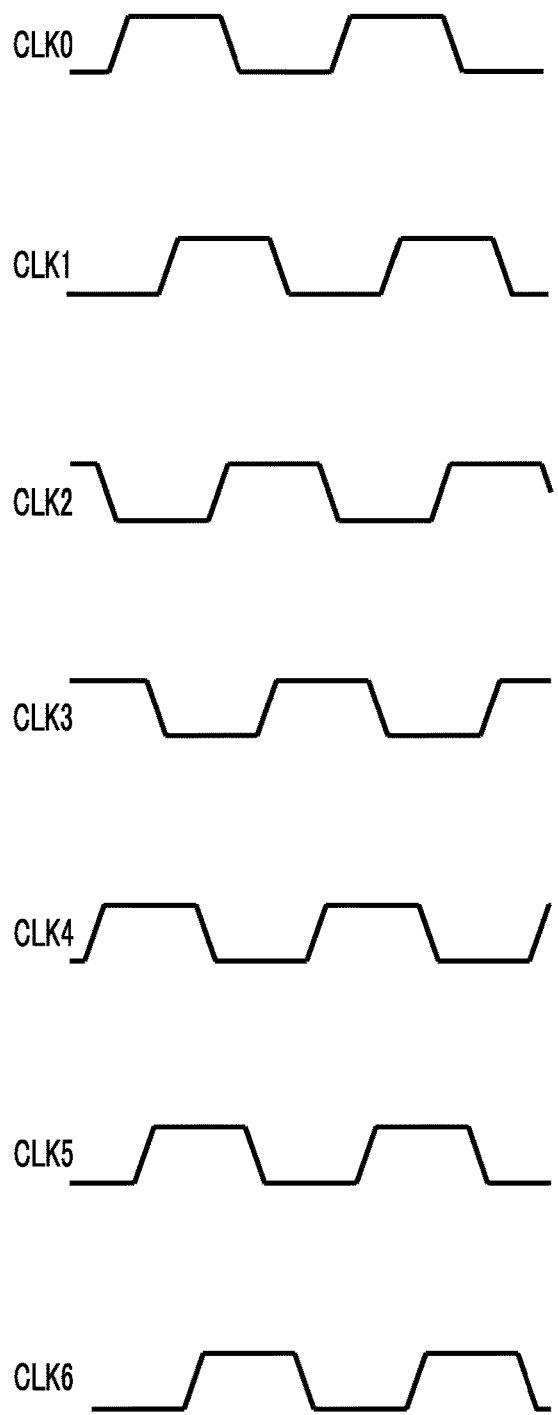
Figure 11A:
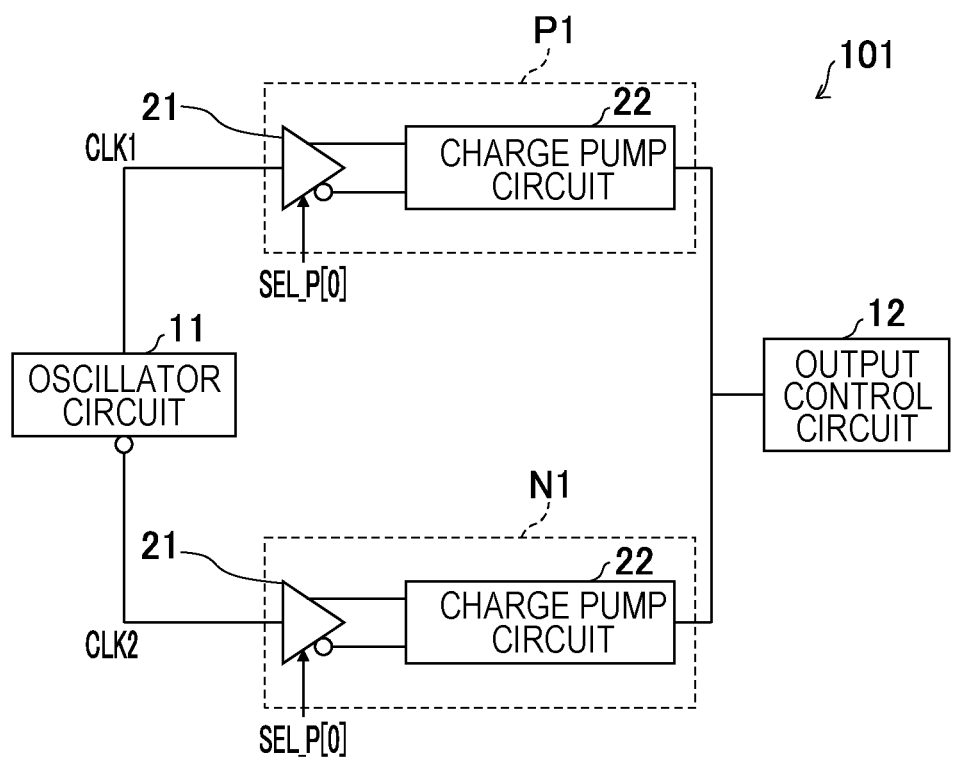
FIG. 11A is a block diagram depicting a configuration of a negative voltage generation circuit of the related art.
Figure 11B:
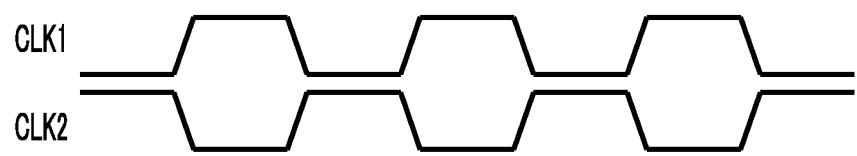
FIG. 11B depicts waveforms illustrating the relation between the oscillator signals depicted in FIG. 11A.

In the internal voltage generation circuit 3, as depicted in FIG. 10B, the oscillator circuit 11 generates at regular intervals in time seven oscillator signals CLK0 to CLK6 that have different phases and outputs the oscillator signals CLK0 to CLK6 to the negative voltage generation circuits P1 to P4 and N1 to N4.

Operation and Benefit of Internal Voltage Generation Circuit

In the above configuration, the oscillator circuit 11 outputs seven signals CLK0 to CLK6 having a fixed phase difference to each of the signal drive circuits 21 in the negative voltage generation circuits P and N in the internal voltage generation circuit 3. The signal drive circuit 21 operates in response to the input signals CLK0 to CLK6 to generate drive signals A and B to drive the charge pump circuit 22. The drive signals A and B have a fixed phase difference similarly to the oscillator signals CLK0 to CLK6. Since this phase difference enables the charge pump circuits 22 to operate at regular phase intervals, periodically generated noise can be smoothed, and noise suppression is realized.

In addition, since each of the negative voltage generation circuits N operates in a phase opposite to the phase of a corresponding one of the negative voltage generation circuits P, simultaneous operation of the negative voltage generation circuits P and N enhances noise suppression capability of the internal voltage generation circuit 3.

Fourth Embodiment

Yet another embodiment of the present disclosure will be described below. For the sake of brevity, components having functions that are the same as or similar to the functions of the components described in the above embodiments are denoted by the same numerals or symbols and are not repeatedly described herein.

An internal voltage generation circuit according to the present embodiment may include a charge pump circuit 22 that generates a positive voltage in an internal voltage generation circuit according to the embodiment described above. In this case, the charge pump circuit 22 can generate a voltage that is higher than the provided supply voltage and that has low noise. Such an internal voltage generation circuit can be used, for example, for the purpose of ensuring an operation margin for an analog circuit.

Conclusion

An internal voltage generation circuit according to a first aspect of the present disclosure is an internal voltage generation circuit that is formed on a semiconductor integrated circuit and that includes an oscillator circuit 11 that generates an oscillator signal, a first voltage generation unit and a second voltage generation unit (negative voltage generation circuits P and N), each of which includes a charge pump circuit 22 and a signal drive circuit 21 that receives the oscillator signal and that generates one or more drive signals to drive the charge pump circuit 22, and an output control circuit 12 that controls an output voltage that is output from the charge pump circuit 22. The first voltage generation unit and the second voltage generation unit are connected parallel to each other. The one or more drive signals are input in opposite phases to the charge pump circuit 22 in the first voltage generation unit and to the charge pump circuit 22 in the second voltage generation unit. A plurality of pairs of the first voltage generation unit and the second voltage generation unit are disposed, and the first voltage generation unit and the second voltage generation unit are located adjacent to each other.

In the above configuration, a plurality of pairs of the first voltage generation unit and the second voltage generation unit are disposed, and the first voltage generation unit and the second voltage generation unit are located adjacent to each other. Thus, when variations in the supply voltage and the ground potential of a semiconductor integrated circuit or temporal fluctuations or the like in the drive signal supplied to the charge pump circuit 22 are generated, voltage variations due to such variations and fluctuations in the first voltage generation unit and the second voltage generation unit are nearly equal to each other in magnitude and have opposite phases. This arrangement enables noise due to the voltage variations in the first voltage generation unit to offset noise due to the voltage variations in the second voltage generation unit and enhances noise suppression capability.

The internal voltage generation circuit according to a second aspect of the present disclosure may have a configuration in which the first voltage generation unit (negative voltage generation circuit P) and the second voltage generation unit (negative voltage generation circuit N) that are located adjacent to each other in a freely selected combination in the first aspect are configured to be simultaneously switched on and off.

In the above configuration, for example, when a small amount of output current that is output from the internal voltage generation circuit is sufficient, the output current is easily adjusted (increased or decreased).

The internal voltage generation circuit according to a third aspect of the present disclosure may have a configuration in which a plurality of first voltage generation units (negative voltage generation circuits P) and a plurality of second voltage generation units (negative voltage generation circuits N) in the second aspect are arranged in a plurality of columns that are connected parallel to each other. The plurality of first voltage generation units and the plurality of second voltage generation units may be alternately arranged in a column direction and in a row direction, and the combination of the first voltage generation unit and the second voltage generation unit that are simultaneously switched on and off may include the first voltage generation unit and the second voltage generation unit that are arranged in the row direction.

In the above configuration, the combination of the first voltage generation unit and the second voltage generation unit that are simultaneously switched on and off includes the first voltage generation unit and the second voltage generation unit arranged in the row direction. Thus, the first voltage generation unit and the second voltage generation unit that are located at the same position in the column direction are simultaneously switched on and off. When variations in the supply voltage and the ground potential of a semiconductor integrated circuit or temporal fluctuations or the like in the drive signal supplied to the charge pump circuit 22 are generated, the first voltage generation unit and the second voltage generation unit are subjected to a similar effect of the voltage variations due to such variations and fluctuations. This arrangement enables noise due to the voltage variations in the first voltage generation unit to offset noise due to the voltage variations in the second voltage generation unit and further enhances noise suppression capability.

The internal voltage generation circuit according to a fourth aspect of the present disclosure may have a configuration in which the freely selected combination in the second or third aspect is constituted by units selected from the first voltage generation units and the second voltage generation units (negative voltage generation circuits P and N) excluding at least the first voltage generation unit or the second voltage generation unit located at one end of the arrangement of the first voltage generation units and the second voltage generation units.

In the above configuration, the freely selected combination of the first voltage generation unit and the second voltage generation unit that are simultaneously switched on and off is constituted by units selected from the first voltage generation units and the second voltage generation units (negative voltage generation circuits P and N) excluding at least the first voltage generation unit or the second voltage generation unit located at one end of the arrangement of the first voltage generation units and the second voltage generation units. Thus, a first voltage generation unit or a second voltage generation unit that is inactive is present between an external circuit and a first voltage generation unit or a second voltage generation unit located at least at one end of a combination of the first voltage generation units and the second voltage generation units, which simultaneously operate. This arrangement can reduce both of the effect of external circuits, such as noise, on the first and second voltage generation units, which are active, and the effect, such as noise, of the first and second voltage generation units, which are active, on external circuits.

The internal voltage generation circuit according to a fifth aspect of the present disclosure may have a configuration in which the oscillator circuit 11 generates at regular intervals in time oscillator signals having different phases and the signal drive circuit 21 receives the oscillator signals to generate the drive signals in any one of the first aspect to the fourth aspect.

In the above configuration, the oscillator circuit 11 generates oscillator signals having different phases, and the signal drive circuit 21 receives the oscillator signals to generate drive signals and drives the charge pump circuit 22. This configuration enables the charge pump circuits 22 to operate at regular phase intervals, and periodically generated noise can be smoothed, leading to noise suppression.

The internal voltage generation circuit according to a sixth aspect of the present disclosure may be a positive voltage generation circuit in any one of the first aspect to the fifth aspect.

The present disclosure is not limited to the embodiments described above, and various modifications are possible within the scope defined in the claims. An embodiment obtained by appropriately combining technical methods disclosed in each of the embodiments is also within the technical scope of the present disclosure. Further, combining technical methods disclosed in each of the embodiments can produce a new technical feature.

The present disclosure contains subject matter related to that disclosed in Japanese Priority Patent Application JP 2018-035709 filed in the Japan Patent Office on Feb. 28, 2018, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An internal voltage generation circuit formed on a semiconductor integrated circuit, the internal voltage generation circuit comprising:
    an oscillator circuit that generates an oscillator signal;
    a first voltage generation unit and a second voltage generation unit, each of which includes a charge pump circuit and a signal drive circuit that receives the oscillator signal and that generates one or more drive signals to drive the charge pump circuit; and
    an output control circuit that controls an output voltage that is output from the charge pump circuit,
    wherein the first voltage generation unit and the second voltage generation unit are connected parallel to each other, the one or more drive signals are input in opposite phases to the charge pump circuit in the first voltage generation unit and to the charge pump circuit in the second voltage generation unit,
    a plurality of pairs of the first voltage generation unit and the second voltage generation unit are disposed,
    the first voltage generation unit and the second voltage generation unit are located adjacent to each other, and
    the first voltage generation unit and the second voltage generation unit that are located adjacent to each other in a freely selected combination are configured to be simultaneously switched on and off.

2. The internal voltage generation circuit according to claim 1, wherein a plurality of first voltage generation units and a plurality of second voltage generation units are arranged in a plurality of columns that are connected parallel to each other, the plurality of first voltage generation units and the plurality of second voltage generation units are alternately arranged in a column direction and in a row direction, and the combination of the first voltage generation unit and the second voltage generation unit that are simultaneously switched on and off includes the first voltage generation unit and the second voltage generation unit that are arranged in the row direction.

3. The internal voltage generation circuit according to claim 1, wherein the freely selected combination is constituted by units selected from the first voltage generation units and the second voltage generation units excluding at least the first voltage generation unit or the second voltage generation unit located at one end of the arrangement of the first voltage generation units and the second voltage generation units.

4. An internal voltage generation circuit formed on a semiconductor integrated circuit, the internal voltage generation circuit comprising:

an oscillator circuit that generates an oscillator signal;

a first voltage generation unit and a second voltage generation unit, each of which includes a charge pump circuit and a signal drive circuit that receives the oscillator signal and that generates one or more drive signals to drive the charge pump circuit; and an output control circuit that controls an output voltage that is output from the charge pump circuit, wherein the first voltage generation unit and the second voltage generation unit are connected parallel to each other, the one or more drive signals are input in opposite phases to the charge pump circuit in the first voltage generation unit and to the charge pump circuit in the second voltage generation unit, a plurality of pairs of the first voltage generation unit and the second voltage generation unit are disposed, the first voltage generation unit and the second voltage generation unit are located adjacent to each other, the oscillator circuit generates oscillator signals having different phases, and the signal drive circuit receives the oscillator signals and generates the one or more drive signals at regular phase intervals.

* * * * *